Aug. 28, 1923.

J. I. SANDERS

FLOAT

Filed Aug. 5, 1922

1,466,601

J. I. Sanders
INVENTOR

BY Victor J. Evans
ATTORNEY

WITNESS:

Patented Aug. 28, 1923.

1,466,601

UNITED STATES PATENT OFFICE.

JAMES I. SANDERS, OF COLUMBUS, KANSAS.

FLOAT.

Application filed August 5, 1922. Serial No. 579,834.

*To all whom it may concern:*

Be it known that I, JAMES I. SANDERS, a citizen of the United States, residing at Columbus, in the county of Cherokee and State of Kansas, have invented new and useful Improvements in Floats, of which the following is a specification.

This invention aims to provide a device designed to be used in conjunction with a fishing line, for the purpose of preventing the line from being moved by the current of water in a direction of the shore, but on the contrary holding the line extended in the direction of mid-stream.

More specifically stated, the invention makes use of two floats, one being shaped to right itself in the current or stream, and the other being provided with a keel, which is moved by the current so as to hold the device and the line extended in the direction of mid-stream, the floats being connected by parallel members which are pivotally associated with the floats so that their angular positions can be varied, while one of the connecting members is constructed to receive the line.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1:
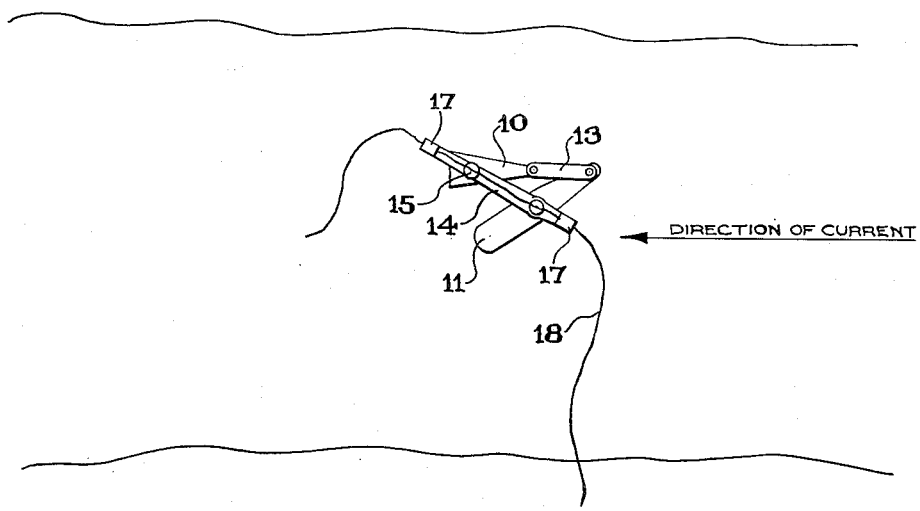
Figure 1 is a diagrammatic plan view.
Figure 2:
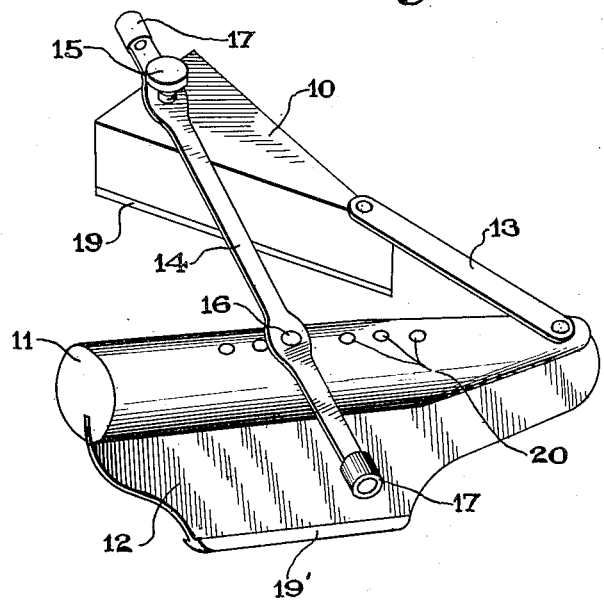
Figure 2 is a perspective view of the device, forming the subject matter of the invention.

The device forming the subject matter of the present invention comprises a float 10 which is substantially wedge-shaped so as to right itself in the current of the stream, and a float indicated at 11 which includes a keel 12. These floats are arranged in spaced relation as illustrated and are connected by two arms 13 and 14 respectively. The arm 13 has its terminals connected to the adjacent extremities of the floats as shown in Figure 2 and is pivotally associated therewith, to permit the floats 10 and 11 to assume different angular positions. The arm 14 is considerably longer than the arm 13, and is pivotally connected with the floats as at 15 and 16. This arm projects beyond the floats and has its terminals formed to provide loops 17 through which the fishing line 18 is passed. The pivot 15 is in the nature of a thumb screw, which when tightened hold the floats fixed relatively in the position given the same, while the pivot 16 can be arranged at any suitable point throughout the length of the float 11, thereby changing the angularity of the arm 14 with respect to the floats, and considerably change the angular relation of the floats one with the other. Each float 10 and 11 is provided with a weighted element one being indicated at 19 and the other being indicated at 19' such as a piece of lead or the like, which holds the floats vertically disposed. In practice, the float together with the line is arranged in the stream, and by reason of the configuration of the float 10, the latter rights itself in the stream, or in other words, remains in a true vertical position. The current of the stream striking against the keel 12 of the float 11, which is arranged at an angle with respect to the float 10, tends to move the float toward midstream, or in other words, keeps the line in a position for use, that is prevents the current of the stream from moving the line out of position for use, such as for instance, in the direction of the shore. The float 10 can be arranged at either side of the float 11, by loosening the thumb screw 15 to position the floats relatively for either a right or left current, or to properly position the floats depending upon which side of the bank of the stream the line is extended from. It is to be understood that the component parts of the device may vary in size and may be also constructed from any suitable material without departing from the spirit of the invention.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A device of the character described comprising spaced floats, one of the floats being substantially wedge-shaped, a keel forming part of the other float, spaced arms connecting said floats and pivotally associated therewith, whereby said floats may be arranged in angular relation for the purpose specified, means for holding said floats fixed relatively in any given position, one of said arms being designed to accommodate a fish line.

2. A device of the character described comprising two floats spaced apart, one of said floats being substantially wedge-shaped, a keel forming a part of the other float, spaced arms connecting said floats, and pivotally associated therewith, one of said arms being susceptible of adjustment along the second mentioned float, whereby the angularity of the arm may be varied, and the floats arranged in different angular positions, and means for holding the latter mentioned arm and said floats fixed relatively, and loops formed on said arm to receive a fishing line for the purpose specified.

In testimony whereof I affix my signature.

JAMES I. SANDERS.